United States Patent [19]

McCoy et al.

[11] Patent Number: 4,666,196

[45] Date of Patent: May 19, 1987

[54] ENERGY ABSORPTION DEVICE AND METHOD OF USE

[76] Inventors: William M. McCoy, 305 Avenida Arlena, San Clemente, Calif. 92672; Lawrence I. Grable, 24031 Plant, Mission Viejo, Calif. 92691

[21] Appl. No.: 801,135

[22] Filed: Nov. 22, 1985

[51] Int. Cl.[4] .............................................. B60R 27/00
[52] U.S. Cl. .................................... 293/128; 293/102; 293/1; 267/141; 267/158
[58] Field of Search ............... 293/102, 126, 128, 145, 293/150, 114, 118, 119, 1; 280/770; 267/158, 160, 141, 165; 188/372; 296/207; 114/219

[56] References Cited

U.S. PATENT DOCUMENTS

| | | | |
|---|---|---|---|
| 1,639,011 | 8/1927 | Taylor | 293/102 |
| 1,749,112 | 3/1930 | Russell | 293/150 X |
| 1,817,866 | 8/1931 | Atkinson | 293/150 |
| 3,473,264 | 10/1969 | Hocka | 293/1 X |
| 4,029,353 | 6/1977 | Barenyi et al. | 296/207 |
| 4,059,301 | 11/1977 | Meyer | 293/126 X |
| 4,461,503 | 7/1984 | Melby | 293/128 X |

Primary Examiner—Johnny D. Cherry
Assistant Examiner—Russell D. Stormer
Attorney, Agent, or Firm—Stetina and Brunda

[57] ABSTRACT

An improved energy absorption device adapted to dissipate energy and thereby protect impact prone surfaces against damage is disclosed, characterized by use of a base member formed to be affixed to the surface to be protected, an impact/facia member pivotally mounted to the base member, and a spring member extensible between the base member and impact/facia member for disposing the impact/facia member in a stowed and/or operable orientation. The various members cooperate with one another to normally maintain the impact/facia member in a stowed orientation by way of an over center latching mechanism and permit rapid deployment of the impact/facia member into an operative position merely by pivoting the impact/facia member outwardly away from the base member.

14 Claims, 6 Drawing Figures

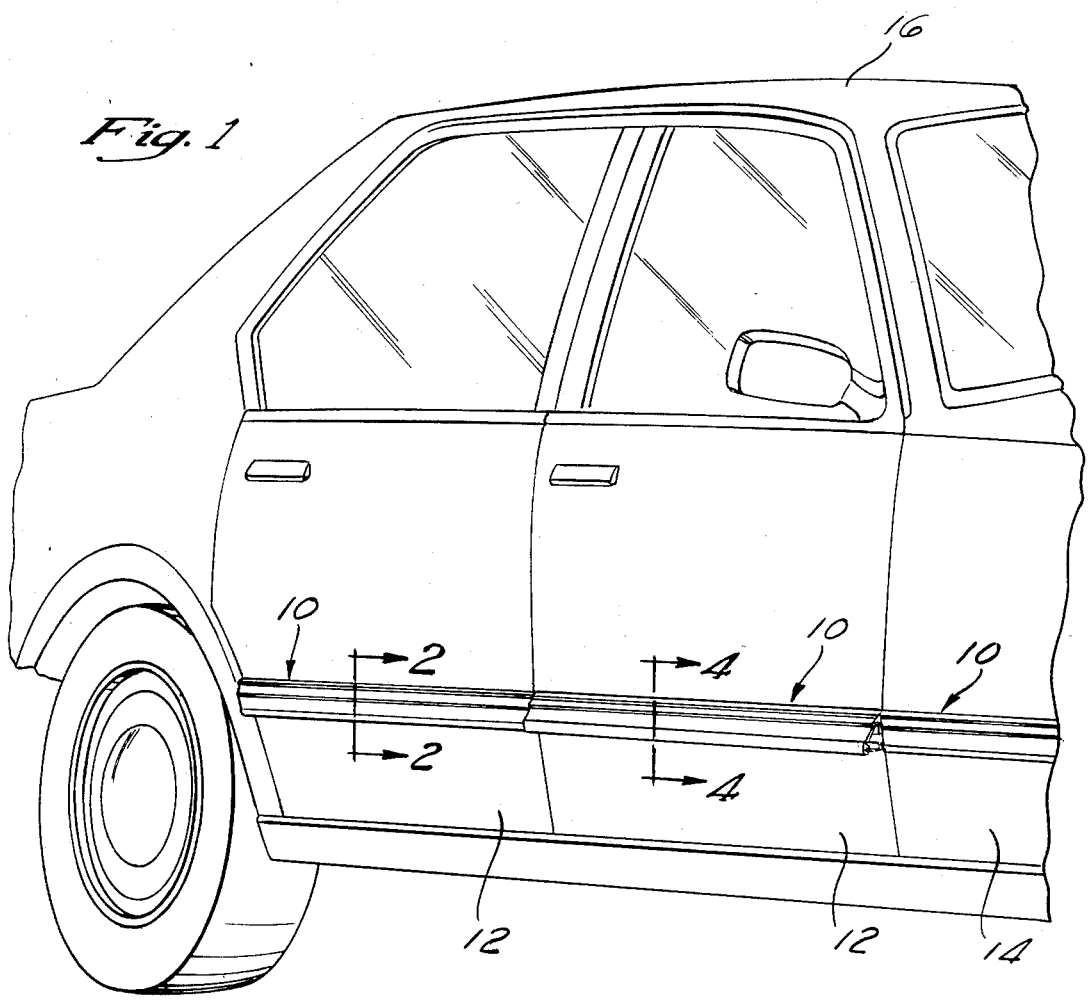
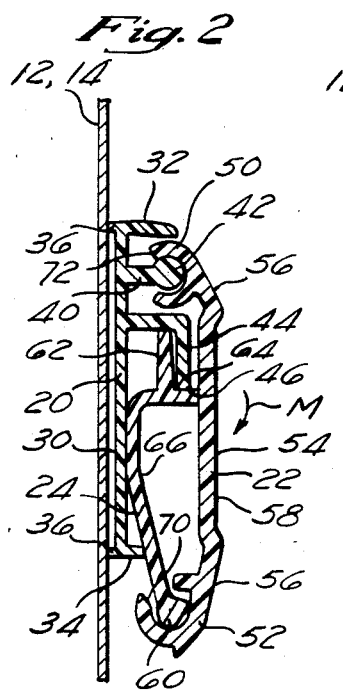
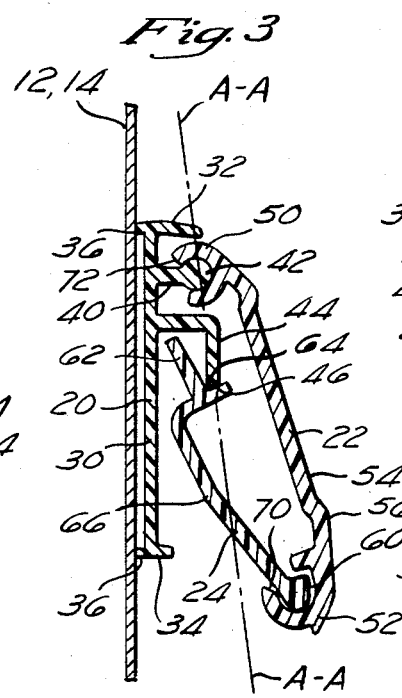
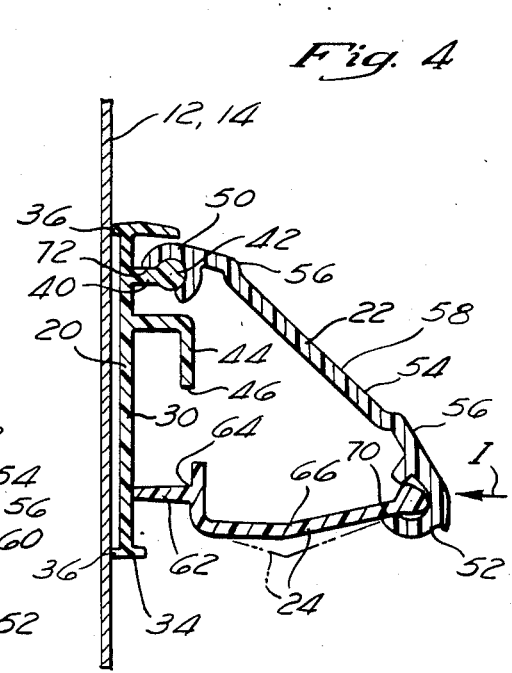

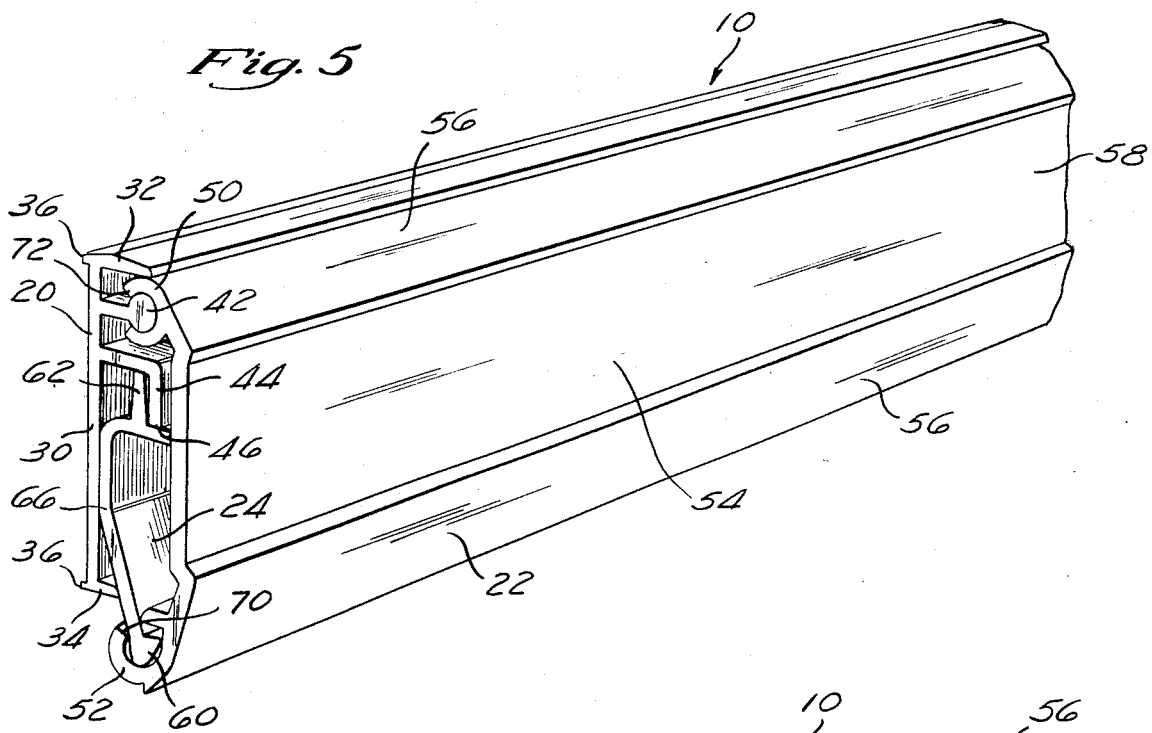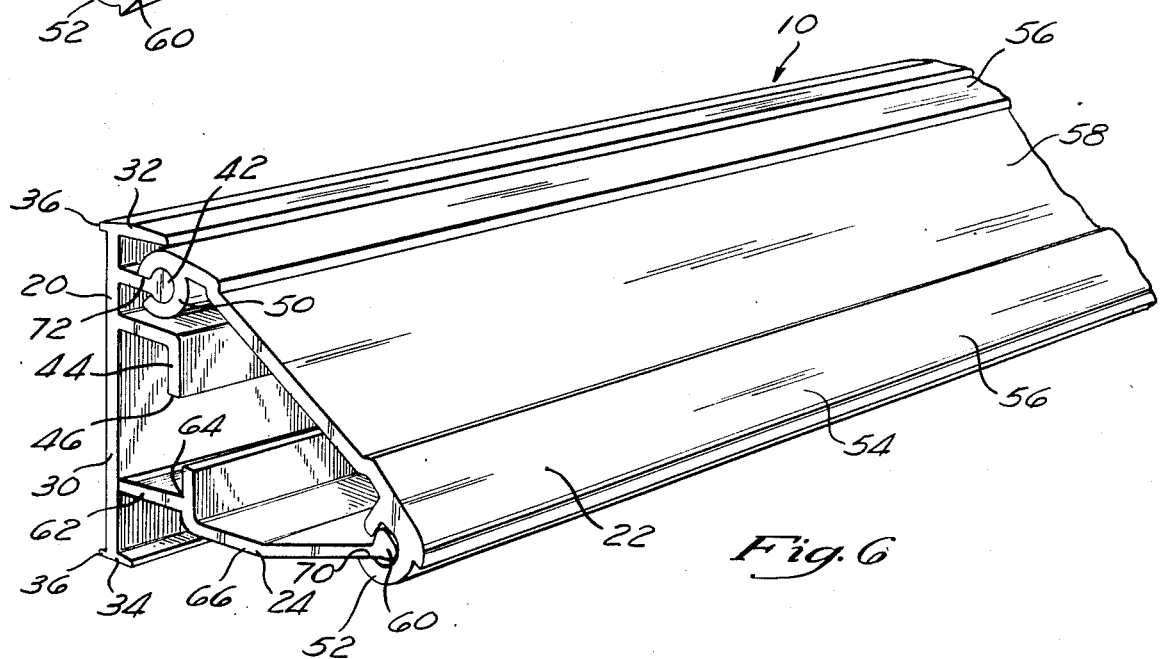

ENERGY ABSORPTION DEVICE AND METHOD OF USE

BACKGROUND OF THE INVENTION

The present invention relates broadly to energy absorption devices and, more particularly, to an improved energy absorption device adapted to form a physical barrier to prevent damage to various surfaces prone to frequent impact, such as motor vehicle side door and quarter panels, boat docks, building walls, furniture dollies, fork lifts, etc.

As is well known, it is often times desirable and/or necessary to protect impact prone surfaces from damage caused by periodic impact, for instance, motor vehicle side door and quarter panels, boat docks, hallways, forklifts and the like. With specific relation to motor vehicle side door and quarter panels, it has heretofore been customary practice to affix elongate resilient molding strips to the side door and quarter panels of the vehicles which tend to reduce the severity of periodic impact and thereby reduce damage to the vehicle panels.

Typically, such prior art molding strips have been formed of elongate strips of elastomeric material such as rubber which are rigidly affixed to the outermost contours of the vehicle side door and quarter panels to form a resilient guard or barrier to protect the vehicle panels. To conform to aesthetic considerations of the vehicle, such prior art molding strips typically have been formed in a relatively narrow size which do not extend too far outwardly from the vehicle panel surfaces. Although such prior art molding strip devices have proven generally satisfactory for their intended purpose, they possess inherent deficiencies which have detracted from their overall effectiveness.

Foremost of these deficiencies has been the inability of the prior art molding strips to thoroughly prevent impact damage to the vehicle panels. This inability has been primarily due to their narrow size configuration which often protects only certain portions of the vehicle panels located in close proximity to the molding strips while allowing impact to other portions located below and above the molding strips. Similarly, such prior art holding strips often times are not mounted to the vehicle at the vehicle's maximum side panel protrusion nor are they capable of compensating for differing curvatures found in various models of vehicles. Although the severity of this deficiency could be reduced by forming the molding strips in larger size configurations, such larger configurations would necessarily detract from the desired aesthetics of the vehicle. In addition, due to the prior art molding strip devices relying solely upon the energy absorption qualities inherent in elastomeric material, such devices have typically been capable of protecting the vehicle surface from only minor impact forces with moderate or strong impact forces often resulting in damage to the molding strip itself as well as to the vehicle surface. Further, such prior art molding strips have typically proven difficult to install upon a vehicle surface and additionally have proven relatively costly in use.

Thus, there exists a substantial need in the art for a relatively low cost energy absorption device which provides improved impact absorption characteristics and compensates for differing sidewall curvatures of motor vehicles while being aesthetically commensurate with vehicle design considerations.

SUMMARY OF THE PRESENT INVENTION

The present invention specifically addresses and alleviates the above-referenced deficiencies associated in the art by providing an improved energy absorption device which is adapted to dissipate energy and thereby protect impact prone surfaces against damage. In the preferred embodiment, the device comprises a base member formed to be affixed to the surface to be protected; an impact/facia member pivotally mounted to the base member and a spring member extensible between the base member and the impact/facia member for disposing the impact/facia member in either a stowed or operative orientation. The base member, impact/facia member and spring member cooperate with one another to normally maintain the impact/facia member in a stowed orientation by way of an overcenter latching mechanism and permit rapid deployment of the impact/facia member into an operative orientation merely by pivoting the impact/facia member outwardly away from the base member whereby the spring member is disposed in an orientation substantially normal to the base member. In its stowed orientation, the improved energy absorption device of the present invention basically functions in a manner analogous to conventional prior art molding strip devices with the impact/facia member conforming to aesthetic considerations. However, when deployed in its operational orientation, the impact/facia member extends substantially outward away from the surface to be protected and cooperates with the spring member to provide a high impact resistant barrier to the surface to be protected, which barrier extends sufficiently outward from the surface to compensate for the curvatures of both the surface to be protected and the surface of the object impacting the device.

The improved energy absorption device of the present invention is preferably formed of a extruded polymer material which enables economical manufacture of the device and permits the device to be utilized in varying impact absorption applications. Although primarily suited to protect vehicle side door and quarter panels, the device additionally is suitable for use in nearly all impact absorption applications such as to protect boat docks, hallways, or any other surface prone to impact.

DESCRIPTION OF THE DRAWINGS

These as well as other features of the present invention will become more apparent upon reference to the drawings wherein:

FIG. 1 is a perspective view of the improved energy absorption device of the present invention mounted upon the side door and quarter panels of a motor vehicle with the device disposed on the front door panel being illustrated in an operative orientation and the device disposed on the rear door panel being depicted in a stowed orientation;

FIG. 2 is a cross-sectional view taken about lines 2—2 of FIG. 1 depicting the relative position of the base member, impact/facia member, and spring member when the device is disposed in a stowed orientation;

FIG. 3 is a cross-sectional view depicting an instantaneous position of the present invention between its stowed and operable orientation;

FIG. 4 is a cross-sectional view taken about lines 4—4 of FIG. 1 depicting the improved energy absorption device of the present invention disposed in an operable orientation;

FIG. 5 is an enlarged perspective view depicting the improved energy absorption device in its stowed orientation; and FIG. 6 is an enlarged perspective view depicting the energy absorption device of the present invention in its operable orientation.

DETAILED DESCRIPTION OF THE PREFERRED EMBODIMENT

Referring to FIG. 1, there is shown the improved energy absorption device of the present invention designated generally by the number 10, which is disposed upon the side door panels 12 and quarter panels 14 of a motor vehicle 16. Although the present invention 10 is specifically adapted for use upon door panels 12 and quarter panels 14 of the vehicle 16, those skilled in the art will recognize that the invention 10 is additionally applicable to protect any impact prone surface such as boat docks, hallways, forklifts, etc. and, therefore, for purposes of this specification, the terms "panel" and/or "surface" shall be defined to include all surfaces desired to be protected from impact.

Referring more particularly to FIGS. 2 through 6, the energy absorption device 10 of the present invention is preferably formed of three elongated members, namely a base member 20, impact member or impact-/facia member 22, and spring member 24 which cooperate with one another to form a composite assembly. In the preferred embodiment, all of the members 20, 22 and 24 are preferably formed of high impact resilient material such as PVC or ABS plastic (although other substitute materials are contemplated) and are preferably extruded in elongate lengths which can be cut by conventional means to desired lengths to permit the device to be utilized in varying applications. Preferably, the device 10 is formed to have a height dimension of approximately two and one-half inches and a width dimension of approximately one-half inch in its stowed orientation which has been found preferable for motor vehicle 16 applications, although substantial variances in the same are contemplated herein to allow application of the device 10 in other impact absorbing applications such as for boat docks and the like.

As shown, the base member 20 is formed having a central web portion 30 and a pair of integrally attached end portions 32 and 34 which preferably extend outwardly in a direction substantially normal to the web portion 30. Both of the end portions 32 and 34 additionally include a small extension or lip 36 which extends a short distance outwardly from one side of the web portion 30. As will be recognized, the base member 20 may be mounted to a support surface (for instance the side door and quarter panels 12 and 14 of the motor vehicle 16) as by way of plural fasteners (including but not limited to screws, adhesives, rivets or the like), not shown, which cause a slight compression of the lip extensions 36 of the end portions 32 and 34 of the base member 20 against the surface 12 and 14 thereby forming a moisture barrier which deters water and the like from collecting between the web 30 of the base member 20 and the surface 12 and 14. Additionally, the lip extensions ensure contact of the end portions of the base member with a curved support surface such as typically encountered on motor vehicle side door and quarter panels 12 and 14.

Adjacent the upper portions of the base member 20 and located below the end portion 32 is a flange 40 which extends in a direction substantially normal to the central portion 30 and terminates in an annular bead 42. The annular bead 42 extends throughout the length of the base member 20 and serves as an attachment point for the impact/facia member 22 of the present invention. An inverted L-shaped flange 44 additionally extends throughout the length of the base member 20 and is located below the flange 40 and annular bead 42. The distal end 46 of the flange 44 is positioned to extend outwardly a short distance beyond the axis of the annular bead 42 which, as will be explained in more detail infra, cooperates with the spring member 24 to form an overcenter latching mechanism which normally maintains the device 10 in a stowed orientation or configuration.

As with the base member 20, the impact member or impact/facia member 22 is additionally formed in an elongate configuration having a generally inverted C-shaped cross-sectional configuration. The upper end of the impact/facia member 22 is provided with a C-shaped flange portion 50 which is sized to receive the annular bead 42 of the flange 40 of the base member 20 therein and allow pivotal movement of the impact/facia member 22 about the axis of the annular bead 42. In the preferred embodiment, the flange portion 50 loosely receives but captures the annular bead 42 such that pivot movement is completely free (i.e. will not bind) even when the base member 20 is mounted to a curved support surface. The lowermost end of the impact/facia member 22 additionally is provided with a generally C-shaped flange 52 which receives the distal end of the spring member 24. The outer surface 54 of the impact/facia member 22 may be provided with various ornamentation such as elongate rib portions 56 and a central recess portion 58 so as to provide an aesthetically pleasing external configuration or facia for the device 10.

The spring member 24 is preferably formed to include a generally inverted L-shaped cross-sectional configuration with its lowermost end terminating in a bulbous shaped bead 60 which is received within the C-shaped flange 52 of the impact/facia member 22. Preferably, the bead 60 is formed in a generally triangular shaped configuration such that its peripheral surface serves as a cam which permits free rotational movement of the bead 60 within the C-shaped flange 52 while ensuring the bead 60 is captured therein such that the bead 60 will not disengage from the flange 52. An upwardly extending projection 62 is provided adjacent the opposite end of the spring member 24 which defines a pivot shoulder 64 which, as depicted in FIGS. 2 and 3, cooperates with the distal end 46 of the flange 44 of the base member 20.

The central portion 66 of the spring member 24 is preferably formed in an offset or bent configuration and is sized such that the distance between the pivot shoulder 64 and the distal end 60 of the spring member is slightly greater than the distance between the distal end 46 of the inverted L-shaped flange 44 and the C-shaped flange 52 of the impact/facia member 22 when the impact/facia member 22 is disposed in its stowed configuration depicted in FIG. 2. Due to this increased length, a slight compression force is exerted by the spring member 24 against the impact/facia member 22 when the impact/facia member 22 is disposed in its stowed configuration (depicted in FIG. 2) which, as will be explained in more detail infra, serves to provide an overcenter latching mechanism which normally urges the impact/facia member 22 into its stowed position.

With the structure defined, the operation and impact absorption characteristics of the present invention may be described with particular reference to FIG. 2 through 6. As previously mentioned, the base member 20 of the present invention is rigidly affixed to the surface 12 and 14 desired to be protected as by way of conventional fasteners which extend through or are applied to the central web 30 of the base member and the support surface 12 and 14. Once installed upon the support surface 12 and 14, the lip projections 36 accomodate curvature of the support surface 12 and 14 and form a moisture barrier against the support surface 12 and 14 which deters any water or the like accumulating between the central web 30 and support surface 12 and 14.

Installed upon the support surface 12 and 14 in such a manner, the device 10 is normally maintained in its stowed position or orientation depicted in FIG. 2 by the slight compression force being exerted within the spring member 24 between the lower C-shaped flange 52 of the impact/facia member 22 and the distal end 46 of the inverted L-shaped flange 44 of the base member 20. Due to this compression force within the spring 24, a moment force M is exerted about the distal end 46 of the inverted L-shaped flange 44 and the abutment shoulder 64 (in a direction indicated by the arrow in FIG. 2) which continuously biases the impact/facia member 22 inwardly toward the support surface 12 and 14. This moment force which is exerted by an overcenter latching mechanism, serves to normally maintain the impact/facia member 22 in its stowed position or orientation wherein the device 10 serves an analogous function to conventional vehicle molding strips.

However, in contrast to the conventional prior art devices, the device 10 of the present invention is specifically formed to be articulated from its stowed position in FIG. 2 to an operative position in FIG. 4 wherein superior energy absorption characteristics are imparted to the device 10. Articulation of the device 10 from its stowed orientation to its operative orientation is accomplished merely by manually grasping the lowermost end of the impact/facia member 22 and pulling the same outwardly in a direction indicated by the the arrow in FIG. 3.

As will be recognized, during application of this outward force to the lowermost end of the impact/facia member 22, the moderate compression force existing within the spring member 24 is overcome. In this regard, the moment force M generated by the compression force within the spring member 24 is maintained until such time as the bulbous bead 60 of the spring member 24 passes beyond an imaginary axis A—A (depicted in FIG. 3) which passes through the bead 50 and pivot shoulder 64 of the inverted L-shaped flange 44. Once the bead 60 has passed outwardly beyond the imaginary axis A—A, the compression force exerted within the spring member 24 is eliminated and the impact/facia member 22 may be extended outwardly by pivotal movment of its upper C-shaped flange 50 about the bead 42 to a position indicated in FIG. 4.

During this outward pivotal movement of the impact/facia member 22, the spring member 24 is free to pivot within the lower C-shaped flange 52 of the impact/facia member 22 whereby the spring member 24 travels from its generally vertical orientation depicted in FIG. 2 to be disposed in a generally horizontal position (substantially normal and preferably a short distance beyond normal to the base member 20 as depicted in FIG. 4). Excessive downward travel of the spring member 24 is prevented by a stop shoulder 70 being formed on the C-shaped flange 52 of the impact/facia member 22. In addition, excessive pivotal movement of the impact/facia member 22 about the annular bead 42 is prevented by abutment of the stop shoulder 72 formed on the upper C-shaped flange 50 of the impact/facia member 22. With the impact/facia member 22 and spring member 24 being disposed in the position indicated in FIG. 4, the device 10 is disposed in an operative orientation.

In this operative orientation, the lower end of the impact/facia member 22 extends substantially outward from the support surface 12 and 14 through a distance sufficient to be initially contacted by various configured objects during an impact situation. Upon confronting an impact force (indicated by the arrow I in FIG. 4), the impact force I is communicated to the base member 20 by way of the spring member 24. Due to the offset or bent configuration of the central portion 66 of the spring member 24, the spring member 24 serves to dissipate the impact force I by moderately deflecting downwardly (as depicted by the phantom lines in FIG. 4) thereby dissipating the impact force I through the energy required to deflect the central portion 66 of the spring member 24. As will be recognized, by varying the cross-sectional thickness of the central portion 66 of the spring member 24, impact dissipation capacity can be modified to allow the device 10 to be utilized in differing impact or energy absorption. Further, it will be recognized that due to the spring member 24 being a linear member disposed substantially normal to the base member 20, the impact force I will be dissipated and distributed over the surface area of the base member 20. Once the impact force I has been dissipated by the spring member 24, the internal resiliency of the spring member 24 causes the central portion 66 of the spring member 24 to return to its initial orientation (depicted by the full lines in FIG. 4).

When it is desired to return the device 10 to its stowed orientation, a user need only pivot the impact/facia member 22 a short distance upwardly (as viewed in FIG. 4) whereby the spring member 24 may additionally be urged upwardly to disengage the distal end of the extension member 62 of the spring member 24 from the base member 20 and pivot (in a clockwise direction) upwardly along the length of the base member 20. Subsequently, the impact/facia member 22 may be pivoted about the annular bead 42 from its operable position shown in FIG. 4 to an intermediate position shown in FIG. 3 whereby the pivot shoulder 64 of the spring member 24 again contacts the distal end 46 of the inverted L-shaped flange 44 of the base member 20. During continued pivotal movement of the impact/facia member 22 toward the base member 20, the spring member 24 is again placed in moderate compression whereby when the bead 60 of the spring member 24 passes beyond the imaginary axis A—A of FIG. 3, the moment force M is re-initiated causing the impact/facia member 22 to snap back to its stowed orientation depicted in FIG. 2. Subsequently, the moment force M exerted by the over center latching mechanism serves to maintain the impact/facia member 22 in its stowed orientation.

Thus, from the above, it will be recognized that the present invention comprises a significant improvement over the prior art energy absorption devices which finds particular suitability in protecting side door and quarter panels 12 and 14 of motor vehicles 16. As will be recognized, in such motor vehicle applications, the device 10 can be normally maintained in its stowed orientation upon the vehicle thereby not detracting from the overall asthetics of the vehicle 16. However, when the vehicle is prone to impact forces such as when the vehicle is parked in a parking lot or garage, a user can rapidly deploy the device 10 into an operative orientation. In this regard, it should be recognized that due to the structural considerations of the present invention, deployment can be accomplished without any use of auxiliary tools and in a matter of seconds, thereby encouraging the use of the same. Similarly, when it is desired to move the vehicle 16 as upon leaving the parking lot or garage, the user can rapidly return the device 10 to its stowed orientation.

Thus, in summary, the present invention specifically addresses and alleviates the above-referenced deficiencies associated in the prior art energy absorption devices. In addition, those skilled in the art will recognize that although certain materials, sizes, and structures have been depicted herein, modifications to the same can be made without departing from the spirit of the present invention and such modifications are contemplated herein.

What is claimed is:

1. An improved energy absorption device for protecting a surface from impact damage comprising:
   a base member adapted for mounting to a surface to be protected;
   an impact member pivotally mounted to said base member; and
   a spring member extensible between said base member and said impact member for selectively disposing said impact member in a first position wherein said impact member generally overlays said base member and is biased toward said base member and a second position wherein said impact member is spaced outwardly from said base member.

2. The device of claim 1 wherein said spring member is pivotally mounted to said impact member.

3. The device of claim 2 wherein said impact member is biased toward said base member in said first position by an over-center latching mechanism formed by said base member, impact member and said spring member.

4. The device of claim 3 further comprising means for maintaining said spring member in an orientation substantially parallel to said base member when said impact member is disposed in said first position.

5. The device of claim 4 further comprising means for maintaining said spring member in an orientation substantially normal to said base member when said impact member is disposed in said second position.

6. The device of claim 5 wherein said spring member is formed to moderately deflect in response to an impact force being applied to said impact member when said impact member is disposed in said second position.

7. The device of claim 6 wherein said spring member is formed of a resilient material.

8. The device of claim 7 wherein said spring member, base member and impact member are extruded in desired lengths.

9. The device of claim 8 wherein said spring member, base member and impact member are formed of PVC material.

10. The device of claim 8 wherein said impact member is provided with exterior surface contours to provide an asthetic facia for said device.

11. A method of protecting a surface from damage caused due to an impact situation comprising the steps of:
    mounting a base member of an energy absorption device onto a surface desired to be protected, said energy absorption device including an impact member pivotally mounted to said base member, and a spring member extensible between said base member and said impact member; and,
    pivoting said impact member outwardly away from said base member through a distance sufficient to allow said spring member to travel from a first position generally parallel to said base member to a second position generally perpendicular to said base member; and
    supporting said impact member in a pivotal orientation angularly inclined and spaced outwardly from said base member through a sufficient distance such that said impact member will be initially contacted during an impact situation.

12. The method of claim 11 wherein said pivoting step comprises the further step of overcoming a biasing force applied by said spring member to said impact member which acts to maintain said impact member in a stowed orientation in close proximity to said base member.

13. The method of claim 12 further comprising the further steps of:
    pivoting said spring member toward said impact member; and
    pivoting said impact member toward said base member to return said impact member to its stowed orientation.

14. An improved energy absorption device for protecting a motor vehicle exterior surface comprising:
    an elongate base member adapted to be mounted and extend along the exterior surface of a motor vehicle desired to be protected;
    an elongate impact member pivotally mounted adjacent one side of said base member; and
    an elongate spring member having one side captured by said impact member, said spring member sized to extend between and cooperate with said base member and said impact member to bias said impact member toward said base member in a first stowed orientation so that said impact member overlays said base member and support said impact member outwardly from said base member in a second operative orientation wherein said impact member is angularly inclined relative said base member to dissipate an impact force over the length of the exterior surface of the motor vehicle.

* * * * *